(No Model.)
A. F. BOARDMAN.
STEERING GEAR FOR BICYCLES.
No. 565,718. Patented Aug. 11, 1896.
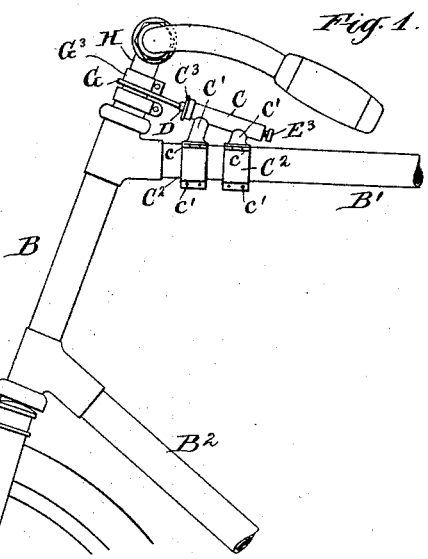
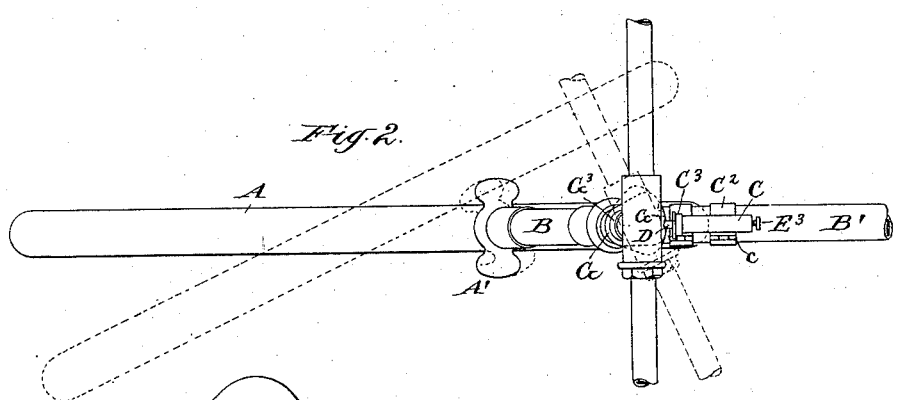
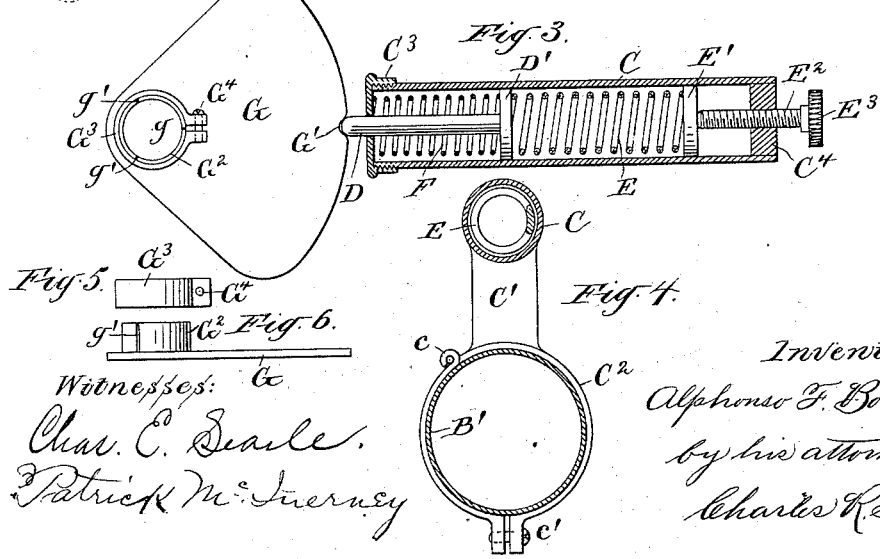
Witnesses:
Chas. E. Searle.
Patrick McInerney
Inventor:
Alphonso F. Boardman,
by his attorney
Charles R. Searle.

UNITED STATES PATENT OFFICE.

ALPHONSO F. BOARDMAN, OF BROOKLYN, NEW YORK.

STEERING-GEAR FOR BICYCLES.

SPECIFICATION forming part of Letters Patent No. 565,718, dated August 11, 1896.

Application filed December 26, 1895. Serial No. 573,237. (No model.)

*To all whom it may concern:*

Be it known that I, ALPHONSO F. BOARDMAN, a citizen of the United States, residing in Brooklyn, in the county of Kings and State of New York, have invented a certain new and useful Improvement in Steering-Gear for Bicycles, of which the following is a specification.

The object of my invention is to provide means whereby the front or steering wheel of a bicycle or similar vehicle shall be held with slight but appreciable force in line or parallel with the driving wheel or wheels, so that the vehicle will continue to move in a straight line without close attention by the rider, enabling him to relax the grasp upon the handle-bar or to remove his hands until a change of course is necessary.

The invention consists of a spring-dog attached to a convenient portion of the frame near the steering-head, arranged to lightly interlock with a correspondingly-formed member attached to the handle-bar post and moving therewith. I have shown the invention applied to a bicycle. The spring-dog is mounted in a casing adjustably secured upon the upper tube of the frame, and projects forward against a horizontally-disposed plate secured to the handle-bar post near its junction with the head, provided with a slight notch in its rear edge, into which the projecting end of the spring-dog enters when the handle-bar is in the mid-position and the steering and driving wheels are in line. The tension of the spring may be increased or diminished, correspondingly increasing and diminishing the degree of force with which the notch is engaged, by advancing or retracting a screw conveniently situated. The whole is arranged to be easily applied or removed when desired, and may be attached to any of the ordinary styles of bicycles without requiring any change in construction.

The advantages of the invention are obvious to any one accustomed to riding. It allows the rider to rest the muscles of the arms and to make adjustments of dress, &c., requiring the use of both hands. It is of advantage, too, in leading the bicycle along the streets, one hand upon the frame or saddle being sufficient so long as the course is straight. The front wheel is held firmly enough to prevent its swinging from side to side when the bicycle is carried from one floor to another, or while leaning in an inclined position against a wall or tree.

The accompanying drawings form a part of this specification and represent what I consider to be the best means of carrying out the invention.

Figure 1 is a side view of the forward portion of a bicycle equipped with my invention. Fig. 2 is a corresponding plan view. Figs. 3, 4, 5, and 6 are on a larger scale and show the attachment alone. Fig. 3 is a plan view, partly in horizontal section. Fig. 4 is a vertical section. Figs. 5 and 6 are side views of the plate and its securing means.

Similar letters of reference indicate the same parts in all the figures.

A is a portion of the front or steering wheel of a bicycle; A', the steering-fork; B, the inclosing head; B', the upper tube of the frame, and $B^2$ the lower tube.

On the upper tube, near its junction with the head B, is mounted a cylindrical casing C, in line with the tube, but set at a slight inclination to the latter to form a nearly right angle with the inclined head. It is supported on short tubular posts C' C', soldered to its under side and to the clamps $C^2$ $C^2$. The clamps are each in two semicircular parts hinged together at $c$ to allow easy attachment and removal, held in strong contact with the inclosed tube by the action of the screws $c'$ $c'$, tapped into a flange on the lower end of the swinging portion and extending through a corresponding flange on the other part. The length of the semicircular parts is such that the clamp will conform to the small differences in diameter of tubes in differing makes of bicycles and slight variations in those of the same make and still be drawn into tight contact by the action of the screws $c'$.

The casing C is closed at the forward end by a screw-cap $C^3$, having a central aperture through which projects the working end of the spring-dog D. The latter is a round rod matching the aperture in the cap and carrying on its inner end a head or guide D', matching pistonwise in the casing C and serving with the aperture to hold the dog in the axial line. The head also serves as an abutment for a stiff spiral spring E, lying within the casing between the head and a follower E', held against rearward movement by the screw E², tapped through the closed rear end C⁴ of the casing C and provided with a milled head E³, by which it may be advanced or withdrawn to adjust the thrusting force exerted by the spring E upon the dog D. A second and much lighter spring F surrounds the forward portion of the dog and is confined within the casing at the front, abutting at one end against the inner face of the screw-cap C³ and at the other against the forward face of the head D'. The purpose of this second spring F is to force back the dog when the tension on the stiff spring E is reduced by withdrawing the screw E² and allow the dog to be drawn back and held against any force tending to advance it. The actual forward thrust of the dog D, therefore, is the difference between the force exerted by the springs E and F, each opposing the other.

The projecting end of the dog D, which engages the notch G' in the plate G, is smoothly rounded, as shown, so as to present a beveled surface in all positions in which it may lie in the casing C. The plate G is in the form of a sector, the circular edge extending rearward and having the notch G' cut in the mid-width. The sector is secured to the handle-bar post H by passing the latter through a circular aperture $g$, matching thereto and surrounded by an upwardly-projecting flange G², split at three or more points $g'$ and drawn into close frictional contact with the post by the surrounding clamp G³ and its securing-screw G⁴.

The notch G' is of sufficient depth to receive the end of the dog D, and has its corners rounded to allow the engagement and disengagement without serious shock as the sector is swung to one side and the other in steering. The sector has considerable width, so that its curved edge shall be always in contact with the dog in all ordinary positions of the handle-bar, and the corners at the junction of the circular edge with angular edges are rounded to insure gentle engagement and disengagement in making contact if the handle-bar is turned so far that the sector leaves the dog. When the sector is properly set and the handle-bar turned to the middle position, the dog enters the notch and tends to lightly hold the steering-wheel in line with the driver and consequently to steer the bicycle in a straight line. The engagement is so slight, however, as to in nowise interfere with a quick change of course by turning the handle-bar, as usual.

The milled head E³ is easily accessible, and the tension on the spring E may be increased or relaxed while the rider is in the saddle. The casing C and its connections may be easily removed by taking out the screws $c'$ and turning the hinged portion of the clamp. The fixed part extends a little more than half the circumference of the tube B', so that in applying and removing it it must be sprung open slightly.

The clamps C² allow the casing to be adjusted farther forward or rearward, as may be found necessary or desirable, to insure proper contact between the projecting end of the dog D and the edge of the plate G in placing the parts in position on the bicycle.

I claim—

1. In a bicycle or similar vehicle, the horizontal plate G adjustably secured to the handle-bar post and having a notch G' in its rearwardly-projecting edge, in combination with the removable casing C and its attaching means C² for allowing its adjustment forward or rearward upon the frame, the spring E within the casing, the adjusting-screw E² having its head E³ exposed and arranged for easily increasing or diminishing the tension of said spring, the dog D subject to the force of the spring and projecting forward from said casing to impinge against the edge of the plate and engage the notch therein when the latter is presented thereto and hold the handle-bar with a slight force against turning in either direction, all substantially as herein specified.

2. The casing C, dog D guided in the casing and having the head D', the spring E for forcing the dog forward, the follower E' and adjusting-screw E², and the spring F for forcing the said dog rearward, in combination with each other and the plate G having the notch G', secured to the handle-bar post of a bicycle or similar vehicle, all arranged to serve substantially as herein specified.

3. The plate G having the notch G' and the aperture $g$ and the split flange G² surrounding the latter, and the clamp G³ for securing the said plate to the handle-bar post of a bicycle, in combination with the casing C secured to the frame by clamps C², the dog D inclosed and guided in said casing, the light spring F for forcing the dog rearward and the spring E for forcing the dog forward, the follower E' and adjusting-screw E², all arranged to serve with a bicycle or similar vehicle, substantially as herein specified.

In testimony that I claim the invention above set forth I affix my signature in presence of two witnesses.

ALPHONSO F. BOARDMAN.

Witnesses:
 JOS. G. HUNTINGTON,
 W. C. BRONSON.